UNITED STATES PATENT OFFICE.

WILLIAM H. ROGERS, OF NEW YORK, N. Y.

IMPROVED MATCH COMPOSITION.

Specification forming part of Letters Patent No. 83,412, dated October 27, 1868.

*To all whom it may concern:*

Be it known that I, WILLIAM H. ROGERS, of the city, county, and State of New York, have invented a new and Improved Match Composition; and I do hereby declare that the following is a full, clear, and exact description thereof, which will enable those skilled in the art to make and use the same.

This invention relates to the use of new materials or ingredients for composing friction and other matches, whereby the match is made self-igniting and combustible throughout its whole length, and whereby the match is made flexible, and may be coiled, like cord or wire, in a small space, thereby greatly economizing room, and rendering the whole match, whatever may be its length, available and useful; and the invention consists in the use, in a match composition, of caoutchouc (or india-rubber) or of gutta-percha, combined with other well-known substances, hereinafter described.

My principal object in this invention is to form a match cord or thread which shall not be affected by dampness, which may be coiled in a very small space, and which shall be combustible and ignitible by friction throughout its entire length, thus securing all the advantages of the common friction-match in about one-twelfth the space they ordinarily occupy.

For the purpose of discovering some substance or substances with which a combustible match composition could be combined which would give it the requisite tenacity and flexibility, I have made many experiments, and have discovered that by combining it with caoutchouc (or india-rubber) or with gutta-percha my object is accomplished. Thus combined, the composition may be spun out into threads or cords, which possess all the qualities of the ignitible and of the common wood friction-match.

In carrying out my invention, I use any of the ordinary friction-match compositions for dipping the ends of those matches, or I form a composition of the ingredients hereinafter named, to which I add the caoutchouc or gutta-percha, viz: one ounce saltpeter; one-half ounce pulverized orris-root; one-eighth ounce minium; one ounce phosphorus. To these ingredients, dissolved, I add about one ounce of dissolved caoutchouc or gutta-percha.

I do not confine myself to any particular proportions, as the composition may be used in different forms, and the proportions of the caoutchouc or gutta-percha may depend upon the form or use for which it is intended.

I claim as new and desire to secure by Letters Patent—

The use of caoutchouc (or india-rubber) or of gutta-percha in a composition for the manufacture of matches, substantially as and for the purposes described.

WM. H. ROGERS.

Witnesses:
WM. F. MCNAMARA,
ALEX. F. ROBERTS.